(12) United States Patent
Tanaka et al.

(10) Patent No.: US 8,064,388 B2
(45) Date of Patent: Nov. 22, 2011

(54) RADIO APPARATUS AND COMMUNICATION SYSTEM USING THE SAME

(75) Inventors: Yasuhiro Tanaka, Aichi (JP); Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 205 days.

(21) Appl. No.: 11/521,484

(22) Filed: Sep. 15, 2006

(65) Prior Publication Data

US 2007/0064645 A1 Mar. 22, 2007

Related U.S. Application Data

(60) Provisional application No. 60/717,191, filed on Sep. 16, 2005.

(51) Int. Cl.
*H04W 4/00* (2009.01)
*H04H 20/71* (2008.01)
*H04L 12/28* (2006.01)
*H04J 3/26* (2006.01)
*H04J 3/24* (2006.01)

(52) U.S. Cl. ........ 370/329; 370/312; 370/431; 370/432; 370/473

(58) Field of Classification Search .......... 370/338, 370/312
See application file for complete search history.

(56) References Cited

U.S. PATENT DOCUMENTS

| | | | | |
|---|---|---|---|---|
| 6,310,558 B1 * | 10/2001 | Minami | .......... | 340/825.52 |
| 7,672,637 B2 * | 3/2010 | Steele et al. | .......... | 455/3.01 |
| 2003/0169769 A1 | 9/2003 | Ho et al. | | |
| 2006/0056443 A1 * | 3/2006 | Tao et al. | .......... | 370/462 |
| 2006/0176804 A1 * | 8/2006 | Shibata | .......... | 370/217 |
| 2008/0228787 A1 * | 9/2008 | Merritt | .......... | 707/100 |

FOREIGN PATENT DOCUMENTS

| | | | |
|---|---|---|---|
| EP | 1 548 990 A1 | | 6/2005 |
| EP | 1548990 A1 | * | 6/2005 |
| JP | 2001-326600 | | 11/2001 |
| JP | 2005-184839 | | 7/2005 |
| JP | 2006-178405 | | 6/2006 |

(Continued)

OTHER PUBLICATIONS

Yang Xiao, "Packing Mechanisms for the IEEE 802.11n Wireless LANs," IEEE Communications Society, Globecom 2004, pp. 3275-3279.

(Continued)

*Primary Examiner* — Patrick Edouard
*Assistant Examiner* — Huy Ho
(74) *Attorney, Agent, or Firm* — McDermott Will & Emery LLP

(57) ABSTRACT

A control unit aggregates packets which are to be sent to one or more terminal apparatuses, and produces aggregated packets. The control unit divides a certain period into a plurality of partial periods, allots each of the plurality of partial periods to any of the plurality of terminal apparatuses and produces a control signal with which to convey an assignment condition to the terminal apparatus. In the case of an aggregated packet where the packets for the plurality of terminals are aggregated, a baseband processing unit and the like transmit the aggregated packet together with the control signal to the plurality of terminal apparatuses. In the case of an aggregated packet where the packets for a single terminal are aggregated, they transmit the aggregated packet to the plurality of terminal apparatuses, without sending the control signal.

4 Claims, 13 Drawing Sheets

FOREIGN PATENT DOCUMENTS

| | | |
|---|---|---|
| WO | WO 2004/112324 A1 | 12/2004 |
| WO | WO 2006/027964 A1 | 3/2006 |

OTHER PUBLICATIONS

International Search Report issued in corresponding Patent Application No. PCT/JP2006/318213, dated Dec. 11, 2006.

Sinem Coleri et al., "Channel Estimation Techniques Based on Pilot Arrangement in OFDM Systems," IEEE Transactions on Broadcasting, Sep. 2002, pp. 223-229, vol. 48, No. 3.

Chinese Office Action issued in Chinese Patent Application No. CN 200680033772.9 dated Sep. 4, 2009.

Chinese Office Action, with English translation, issued in Chinese Patent Application No. 200680033772.9, mailed Apr. 29, 2010.

Chinese Office Action, w/ English translation thereof, issued in Chinese Patent Application No. CN 200680033772.9 dated Mar. 6, 2009.

Japanese Notification of Reason(s) for Refusal, w/ English translation thereof, issued in Japanese Patent Application No. JP 2006-178405 dated Jun. 14, 2011.

* cited by examiner

FIG.3

| L-STF | L-LTF | L-SIG | HT-SIG | HT-STF | HT-LTF | DATA 1 |
|-------|-------|-------|--------|--------|--------|--------|
| L-STF +CDD | L-LTF +CDD | L-SIG +CDD | HT-SIG +CDD | HT-STF +CDD | HT-LTF +CDD | DATA 2 |

RADIO APPARATUS AND COMMUNICATION SYSTEM USING THE SAME

RELATED APPLICATIONS

This application claims the benefit of U.S. Provisional Patent Application No. 60/717,191, filed on Sep. 16, 2005 the disclosure of which Application is incorporated by reference herein.

BACKGROUND OF THE INVENTION

1. Field of the Invention

The present invention relates to radio apparatuses, and it particularly relates to a radio apparatus using multiple subcarriers and a communication system utilizing said radio apparatus.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subjected to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carriers in the beginning of the packet signal, which is the so-called preamble or training signal. The other is the known signal, provided for part of carriers in the data area of the packet signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No.3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. In such a MIMO system, CSMA (Carrier Sense Multiple Access) is carried out to allow the base station apparatus to multiplex a plurality of terminal apparatuses. For the purpose of improving the transmission efficiency or reducing the processing delay, the base station apparatus specifies, in partial periods of time, the timing at which the signals are to be transmitted to a plurality of terminal apparatuses (hereinafter referred to as "transmit timing") and the timing at which the signals from a plurality of terminal apparatuses are to be received (hereinafter referred to as "receive timing"). Then the base station apparatus informs respectively the plurality of terminal apparatuses of said specification, and each of the plurality of terminal apparatuses carries out a processing in accordance with said specification (hereinafter, such a processing will be referred to as "assignment mode"). Here it is assumed that after a plurality of transmit timings for the plurality of terminals are specified consecutively, a plurality of transmit timings are specified consecutively. A terminal apparatus receives a signal at the specified transmit timing. When the receiving has been successful, a terminal apparatus generates an ACK signal and transmits the ACK signal to the base station apparatus at the specified receive timing. When the receiving has failed, the terminal apparatus does not generate the signal.

To raise the transmission efficiency of such a MIMO system, the longer packet signal length is preferred. Thus, when transmitting the data to a receiving apparatus, a transmitting apparatus gathers up the data to be transmitted and then generates packet signals. In this manner, the aggregation of packet signals may be done also in a case when they are destined to a single terminal apparatus, besides the case when they are destined to a plurality of terminal apparatuses. The aggregated packets destined to a single terminal apparatus and those destined to a plurality of terminals may be processed without making distinction there between. However, in such a case, if the aggregated packets destined to a single terminal apparatus undergo the above assignment mode, it will be wasteful for both the base station apparatus and the terminal apparatuses, thus causing the transmission efficiency to deteriorate.

SUMMARY OF THE INVENTION

The present invention has been made in view of the foregoing circumstances and a general purpose thereof is to provide a radio apparatus and a communication system utilizing the same capable of enhancing the transmission efficiency when packets are aggregated.

In order to solve the above problems, a radio apparatus according to one embodiment of the present invention comprises: a generation unit which aggregates packets destined to one or more terminal apparatuses so as to generate an aggregated packet; an assignment unit which divides a certain period into a plurality of partial periods, assigns the plurality of partial periods respectively to any of a plurality of terminal apparatuses and generates a control signal with which to notify an assignment condition of the terminal apparatuses, provided that packets destined to the plurality of terminal apparatuses are aggregated to the aggregated packet; and a communication unit which transmits an aggregated packet together with the control signal to the plurality of terminal apparatuses when the aggregated packet is one for which packets destined to the plurality of terminal apparatuses are aggregated, and which transmits an aggregated packet to the plurality of terminal apparatuses without transmitting the control signal when the aggregated packet is one for which packets destined to a single terminal apparatus are aggregated.

According to this embodiment, whether it is the aggregated packet or not can be conveyed by whether the control signal is present or not, so that the transmission efficiency can be enhanced.

Another embodiment of the present invention relates also to a radio apparatus. This apparatus comprises: a determination unit which acquires information on a destination of a first packet among a plurality of packets aggregated to an aggregated packet and determines if the first packet is destined to oneself, provided that a control signal with which to convey an assignment condition in the aggregated packet has not been received and the aggregated packet to which packets destined to one or more terminal apparatuses are aggregated has been transmitted; and a communication unit which terminates receiving the aggregated packet instantly without receiving the remaining packets in the aggregated packet if it is determined by the determination unit that the first packet is not destined to oneself.

According to this embodiment, when it is determined by the destination information that the first packet is not destined to oneself, the receiving of the aggregated packet is terminated at the then stage. Thus the power consumption can be suppressed.

When the control signal with which to convey the assignment condition in the aggregated packet has not been received and the aggregated packet to which packets destined to one or more terminal apparatuses are aggregated has been transmitted, the communication unit may receive the remaining packets in the aggregated packet if it is determined by the determination unit that the first packet is destined to oneself. In such a case, the remaining packets can be received.

Still another embodiment of the present invention relates to a communication system. This system comprises: a base station apparatus which generates an aggregated packet by aggregating packets destined to one or more terminal apparatuses and transmits the generated aggregated packet; a plurality of terminal apparatuses which receive aggregated data transmitted from the base station apparatus. When packets destined to the plurality of terminal apparatuses are aggregated to the aggregated packet, the base station apparatus divides a certain period into a plurality of partial periods, assigns the plurality of partial periods respectively to any of the plurality of terminal apparatuses, generates a control signal with which to notify an assignment condition of the terminal apparatuses, and transmits the aggregated packet together with the control signal to the plurality of terminal apparatuses, based on the control signal; and when packets destined to a single terminal apparatus are aggregated, the base station apparatus transmits the aggregated packet to the plurality of terminal apparatuses without transmitting the control signal.

When the terminal apparatus has not received the control signal from the base station apparatus and it is determined, by information on a destination of a first packet among a plurality of packets aggregated into the aggregated packet, that the first packet is not destined to oneself, the terminal apparatus may terminate receiving the aggregated packet at the then stage without checking on information on destinations of the remaining packets in the aggregated packet.

When the terminal apparatus has not received the control signal from the base station apparatus and it is determined, by information on the destination of the first packet, that the first packet is destined to oneself, the terminal apparatus may receive the remaining packets in the aggregated packet.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 illustrates a packet format in the communication system shown in FIG. 2;

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments according to the present invention relates to a MIMO system comprised of a plurality of radio apparatuses. One of the radio apparatuses corresponds to a base station apparatus, and the rest thereof to a plurality of terminal apparatuses. The base station apparatus basically carries out CSMA to a plurality of terminal apparatuses. To raise the transmission efficiency, the base station apparatus combines together or aggregates data for a plurality of terminal apparatuses to generate a single packet signal. For a certain period of time, the base station apparatus carries out the assignment mode. In combining data to be transmitted to a plurality of terminal apparatuses into a single packet signal, the base station apparatus can carry out either a "single-receiver mode", in which packets for a single terminal apparatus are aggregated, and a "multi-receiver mode", in which packets for a plurality of terminal apparatuses are aggregated.

In the multi-receiver mode, the base station apparatus broadcasts a control signal notifying each terminal of the assignment condition, such as transmission timing and receiving timing, to a plurality of terminals in advance and then broadcasts an aggregated packet to the plurality of terminal apparatuses. In the single-receiver mode, on the other hand, the base station apparatus does not transmit any control signal in advance but broadcasts an aggregated packet to the plurality of terminal apparatuses.

Figure 1:
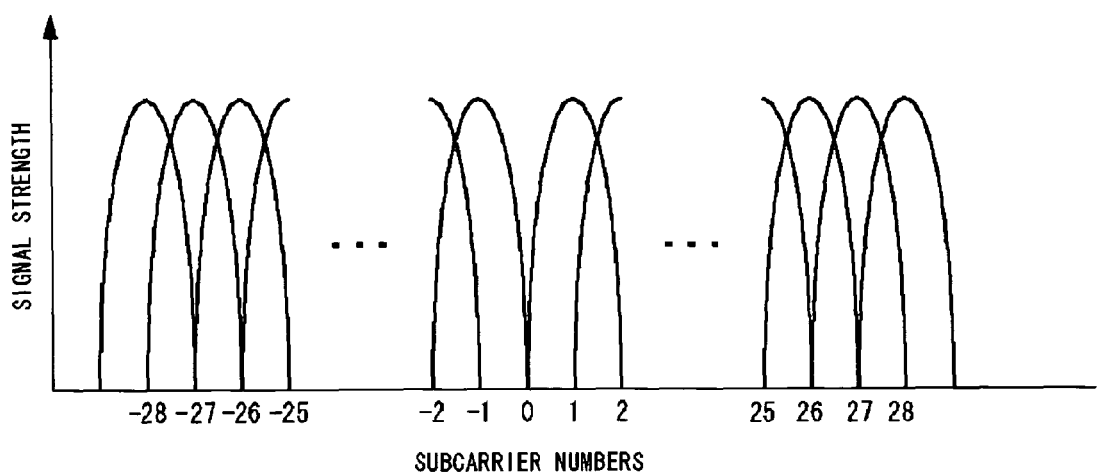
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system which is not compatible with a MIMO system (hereinafter referred to as a "legacy system"). One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM. Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream". As a result thereof, since the mode of modulation scheme and the values of coding rate and the number of streams are set variably, the data rate is also set variably. It is to be noted that the "data rates" may be determined by arbitrary combination of these factors or by one of them.

Figure 2:
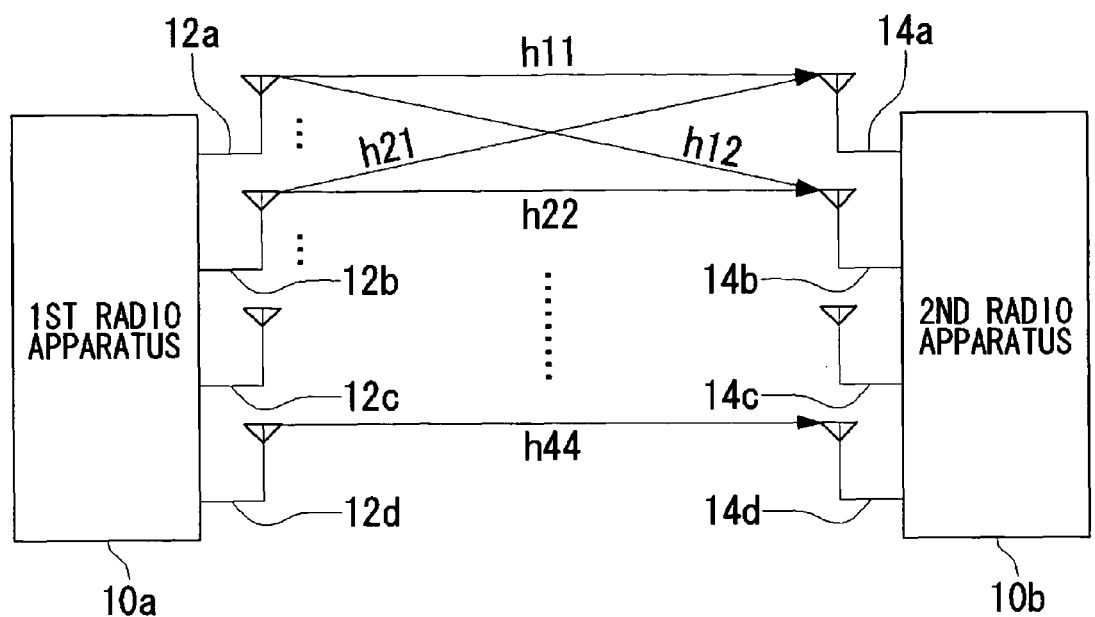
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a base station apparatus, whereas the second radio apparatus 10b corresponds to a terminal apparatus. The first radio apparatus 10a may connect to a plurality of terminal apparatuses, not shown. Here the plurality of terminal apparatuses not shown are represented by a third radio apparatus 10c, fourth radio apparatus 10d and the like. When connecting to the plurality of terminal apparatuses, the first radio apparatus 10a basically performs CSMA.

An outline of a MIMO system will be explained before the description of a structure of the communication system 100. Assume herein that data are being transmitted from the first radio apparatus 10a to the second radio apparatus 10b. The first radio apparatus 10a transmits respectively the data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, the other transmission channels are omitted in FIG. 2.

FIG. 3 illustrates a packet format used by a communication system 100. FIG. 3 illustrates a case where a packet signal is composed of a plurality of streams and one of the streams contains data for a terminal apparatus. Here, data contained in two streams are to be transmitted, and the packet formats corresponding to the first stream and the second stream are shown in the top row and the bottom row, respectively. The number of streams may be greater than 2. In the packet signal corresponding to the first stream, "L-STF", "HT-LTF" and so forth are assigned as preamble signals. "L-STF", "L-LTF" and "L-SIG" and "HT-SIG" correspond to a known signal, for use with timing estimation, compatible with a legacy system, a known signal, for use with channel estimation compatible, with a legacy system, a control signal compatible with a legacy system and a control signal compatible with a MIMO system, respectively. For example, information on data rates is contained in the control signal compatible with a MIMO system. The information on data rates is comprised of information on modulation schemes and the values of the coding rates and the number of streams, as described earlier. "HT-STF" and "HT-LTF" correspond to a known signal, for use with timing estimation, compatible with a MIMO system and a known signal, for use with channel estimation, compatible with a MIMO system, respectively. "DATA 1" is a data signal.

In the second packet corresponding to the second stream, "L-STF +CDD", "HT-LTF +CDD" and so forth are assigned as preamble signals. Here, "CDD" indicates that CDD (Cyclic Delay Diversity) is applied. The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF +CDD" is such that a cyclic timing shift is applied to "L-STF". Here, the amount of timing shift in "L-STF +CDD" may differ from the amount of timing shift in "HT-LTF +CDD".

It is to be noted that the same will be true for a case where "L-STF" and the like are assigned to a third stream and the like. In this case, the amount of timing shift in CDD in the third stream may differ from that in the second stream. The portions from "L-LTF" through "HT-SIG1" or the like use "52" subcarriers in the same way as in a legacy system. Note that, among "52" subcarriers, "4" subcarries correspond to pilot signals. On the other hand, the portions from "HT-LTF" and the like onward use "56" subcarriers.

Figure 4:
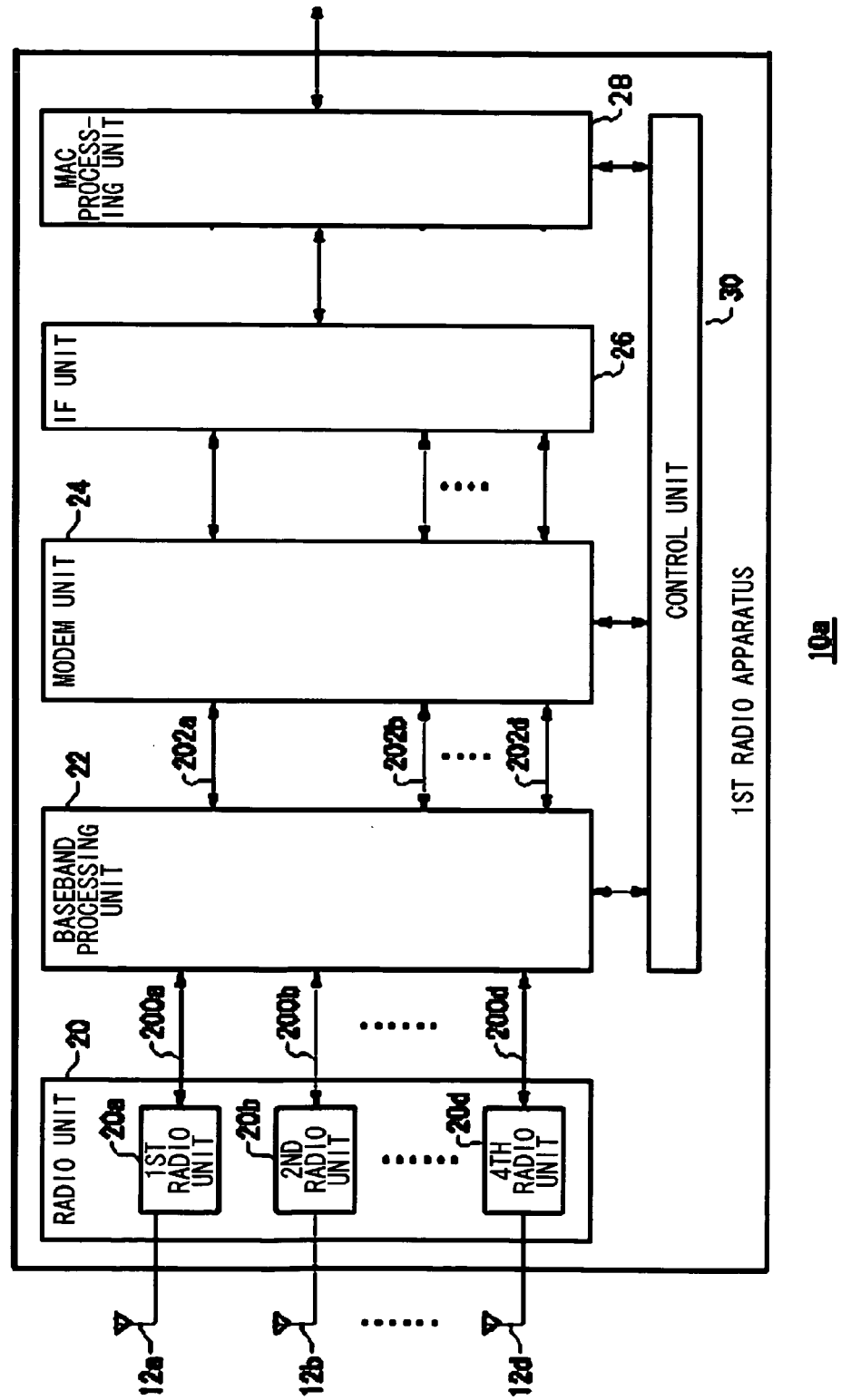
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26, a MAC processing unit 28 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". It is to be noted that the second radio apparatus 10b is so structured as to correspond to the first radio apparatus 10a. As described earlier, if the first radio apparatus 10a corresponds to the base station apparatus, the second radio apparatus 10b will correspond to a terminal apparatus.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
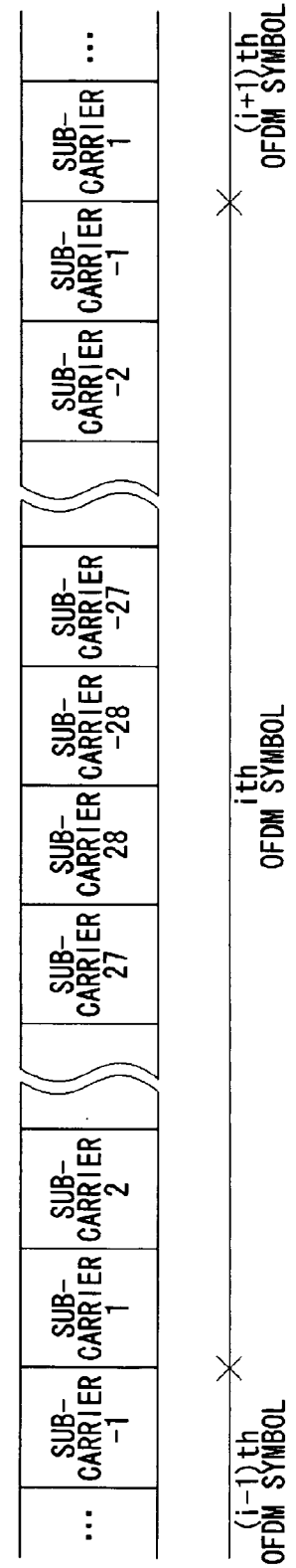
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol.

Now refer back to FIG. 4. The baseband processing unit 22 performs CDD to generate packet signals corresponding to FIG. 3. CDD is performed as a matrix C expressed by the following Equation (1).

$$C(\lambda)=\text{diag}(1,\exp(-j2\pi\lambda\delta/\text{Nout}),\Lambda,\exp(-j2\pi\lambda\delta(\text{Nout}-1)/\text{Nout})) \quad (1)$$

where δ indicates a shift amount and λ indicates the subcarrier number. The multiplication of C with streams is carried out per subcarrier. That is, the baseband processing unit 22 performs a cyclic time shifting within L-STS or the like on a stream-by-stream basis. When the number of streams is 3 or greater, the shift amount is each set to a different value per stream.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to a plurality of modem units 24.

As a receiving processing, in a MAC (Media Access Control) layer the MAC processing unit 28 performs protocol processing on a data stream combined by the IF unit 26 and then supplies the thus processed data stream to an upper layer. As a transmission processing, the MAC processing unit 28 turns the data given from an upper layer into a packet according to a MAC protocol and supplies the packet to the IF unit 26.

The control unit 30 controls the timing and the like of the first radio apparatus 10a. The control unit 30 generates packet signals as shown in FIG. 3 while controlling the MAC processing unit 28, the IF unit 26, the modem unit 24 and the baseband processing unit 22. When multiplexing a plurality of terminal apparatuses, the control unit 30 carries out CSMA. Since CSMA is a known technique, the description thereof is omitted here, In addition to CSMA, the control unit 30 carries out the assignment mode. This assignment mode is carried out for a certain period of time. Before carrying out the assignment mode, the control unit 30 informs a plurality of terminal apparatuses of the start of the assignment mode via the MAC processing unit 28, IF unit 26, modem unit 24, baseband processing unit 22 and the like. Not only the terminal apparatuses contained in the assignment mode but also terminal apparatuses not contained in the assignment mode are contained as the terminal apparatuses that receive this notification.

In the assignment mode, the control unit 30 transmits control information with which to inform each terminal apparatus of assignment information in a header portion (hereinafter referred to simply as "control signal"). Following the control information, packet signals to be transmitted to a plurality of terminal apparatuses are assigned. The thus assigned packet signals are formed by linking a plurality of packet signals together in a series in such manner as to be divided by a delimiter. In this manner, the packet formed by aggregating a plurality of packet signals are called "aggregated packet". At least one packet signal to be assigned may be time-shared, and each of the time-shared parts may be assigned to the terminal apparatuses. With either structure implemented, the control unit 30 assigns the partial periods with which to transmit signals, to a plurality of terminal apparatuses. Although the partial periods may be set such that a period for each terminal apparatus is indicated separately from the other or the periods for a plurality of terminal apparatuses are integrally indicated, these will be used without making a distinction there between in this patent specification.

Following the partial periods for transmitting the signals, the control unit 30 assigns partial periods with which to receive signals from a plurality of terminal apparatuses, respectively. In the assigned partial periods, the terminal apparatus transmits packet signals to the first radio apparatus 10*a*. In this packet signal, a plurality of packets are assigned contiguously. That is, the control unit 30 divides a certain period into a plurality of partial periods, and assigns the plurality of partial periods to a plurality of terminal apparatuses, respectively, by associating the partial periods with the terminal apparatuses.

A method for assigning the terminal apparatuses to the partial periods will now be described below. Here, a description will be given provided that the first radio apparatus 10*a* is a base station apparatus and the second radio apparatus 10*b*, third radio apparatus 10*c* and fourth radio apparatus 10*d* are terminal apparatuses.

Figure 6A:
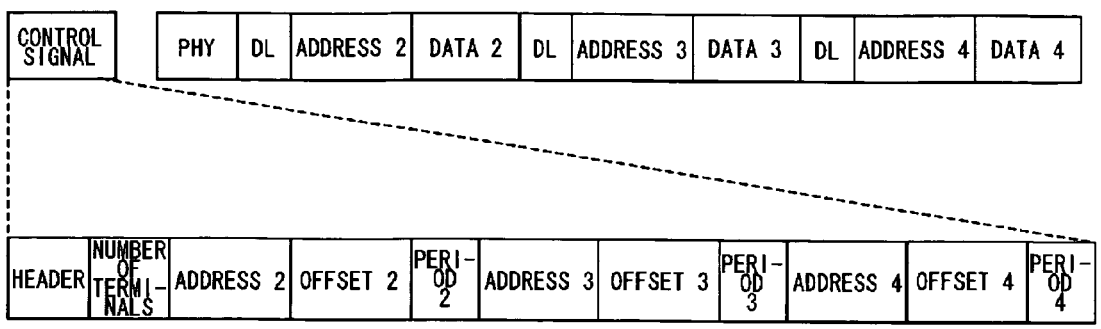
FIG. 6A illustrates a control signal and an aggregated packet in a case when packet signals destined to a plurality of terminal apparatus are aggregated.

FIG. 6A is an illustration for explaining a control signal and an aggregated packet in the multi-receiver mode, in which packets for a plurality of terminal apparatuses are aggregated into a packet signal. A control signal is contained as a MAC packet in the data field of the packet format as explained in conjunction with FIG. 3. The data format of a control signal includes a MAC header, number of destination terminals, addresses of the destination terminals, offset of assigned timing and duration of assigned timing. In this example, there are three destined terminals, namely, three receiving terminals, which are the second radio apparatus 10*b*, the third radio apparatus 10*c* and the fourth radio apparatus 10*d*, and the second address 2, offset 2, duration 2, third address 3, offset 3, duration 3, fourth address 4, offset 4, duration 4 are included in the control signal.

An aggregated packet in the multi-receiver mode is so structured that various preamble signals of physical layer (abbreviated as PHY in FIGS. 6A and 6B) are provided in a header portion and MAC packets to be transmitted to the respective destination terminals are linked together in a series in the data field of the packet format as explained in FIG. 3 in such a manner as to be divided by a delimiter DL. In this example, a packet for the second radio apparatus 10*b* containing address 2 and data 2, a packet for the third radio apparatus 10*c* containing address 3 and data 3, and a packet for the fourth radio apparatus 10*d* containing address 4 and data 4 are aggregated. Note here that header information other than address of MAC packets is omitted for the simplicity of explanation.

Figure 6B:
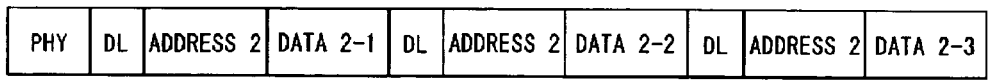
FIG. 6B illustrate an aggregated packet in a case of a single receiver where packet signals destined to a single terminal apparatus is aggregated.

FIG. 6B is an illustration for explaining aggregated packet in the single-receiver mode, in which packets for a single terminal apparatus are aggregated into a packet signal. When the aggregated packets aggregated into a single packet signal are to be broadcast to each terminal apparatus, there is no need to set assignment timing, so that the base station apparatus transmits only the aggregated packets without generating a control signal.

Aggregated packets in the single-receiver mode are so structured that various preamble signals of physical layer are placed in a header portion and a plurality of MAC packets to be transmitted to an applicable terminal are linked together in a series in the data field in such a manner as to be divided by delimiter DL. This example represents a case where the destination terminal apparatus is the second radio apparatus 10*b*. Accordingly, three aggregated packets for the second radio apparatus 10*b* are a first packet containing address 2 and data 2-1, a second packet containing address 2 and data 2-2, and a third packet containing address 2 and data 2-3.

Figure 7:
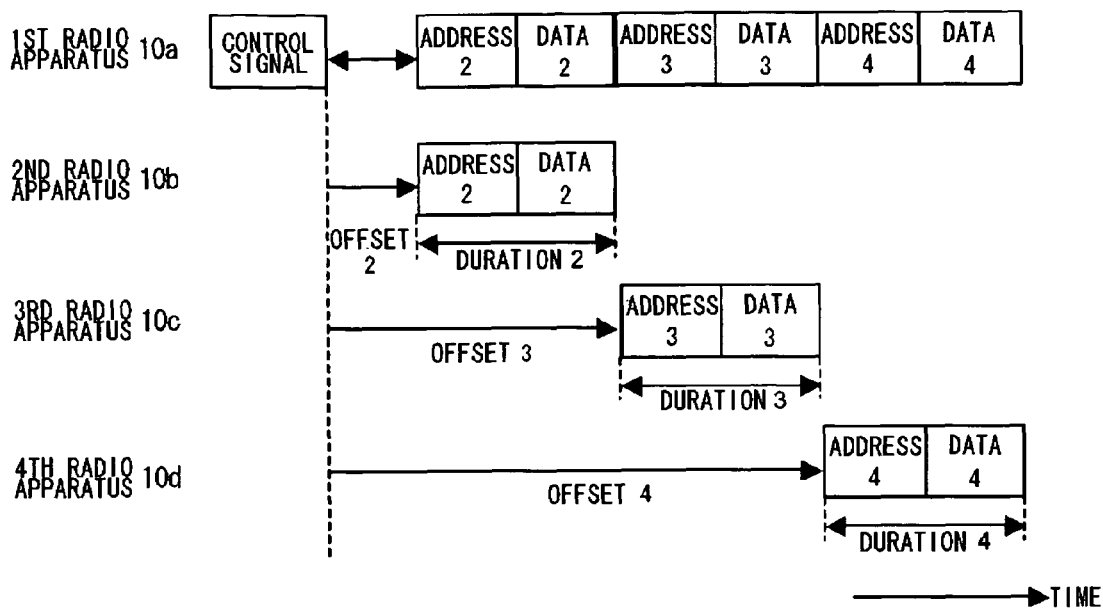
FIG. 7 is a sequence diagram showing a communication in multiple receivers.

FIG. 7 illustrates a sequence of communication in the multi-receiver mode. A control unit 30 of a first radio apparatus 10*a*, which is the base station, broadcasts a control signal and then, after a predetermined time interval, broadcasts aggregated packets for multiple receivers.

Each of the control units 30 of a second radio apparatus 10*b*, a third radio apparatus 10*c* and a fourth radio apparatus 10*d* receives a control signal from the base station, acquires the information on assigned timing contained in the control signal, receives the packets addressed to itself at the assigned timing and enters a power save mode at other timings. FIG. 7, whose horizontal axis is time, shows the timings of transmission and receiving of data between the base station and the terminals, in disregard of the delay time that occurs when packets are transmitted from base station to terminal.

After the passage of time of offset 2 following the receiving of a control signal, the control unit 30 of the second radio apparatus 10*b* performs a receiving within the time specified by duration 2, in which it selectively receives the packets containing address 2 and data 2 out of the aggregated packets as packets addressed to itself. In the time period other than the duration 2, the second radio apparatus 10*b* can enter the power save mode.

Similarly, after the passage of time of offset 3 following the receiving of a control signal, the control unit 30 of the third radio apparatus 10*c* performs a receiving within the time specified by duration 3, in which it selectively receives the packets containing address 3 and data 3 out of the aggregated packets as packets addressed to itself. Then it enters the power save mode in the time period other than the duration 3. The same applies to the fourth radio apparatus 10*d* as well.

Figure 8:
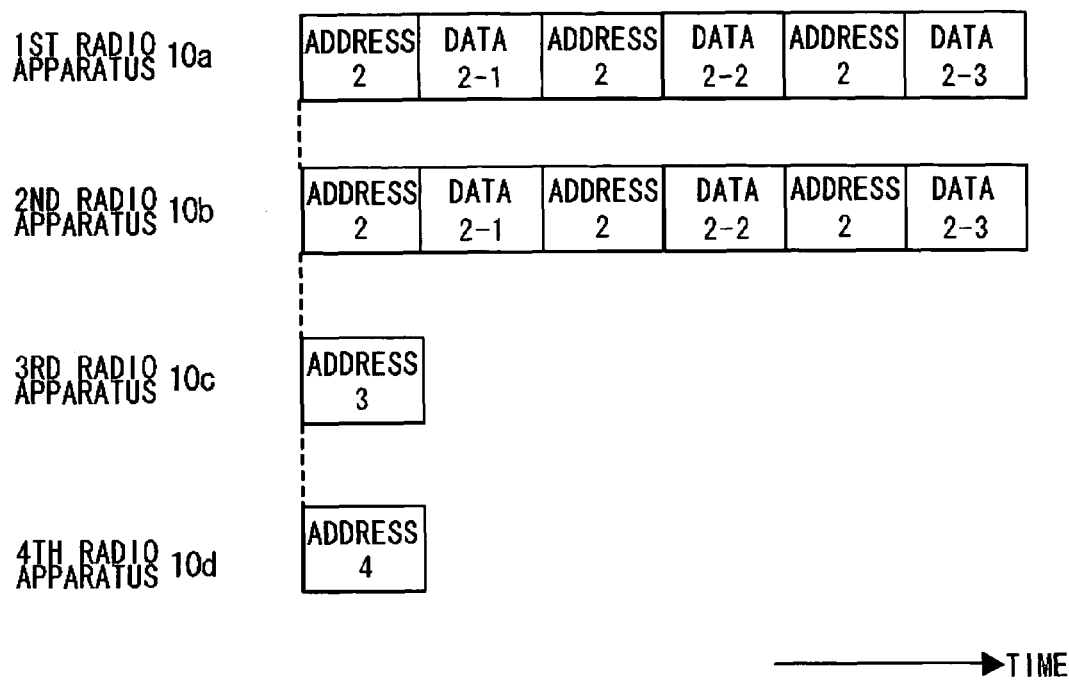
FIG. 8 is a sequence diagram showing a communication in a single receiver.

FIG. 8 illustrates a sequence of communication in a single-receiver mode. In the single-receiver mode, a control unit 30 of a first radio apparatus 10*a*, which is the base station, broadcasts aggregated packets only, without sending a control signal.

Each of a second radio apparatus 10*b*, a third radio apparatus 10*c* and a fourth radio apparatus 10*d* begins demodulating data as it receives the data from the top of aggregated packets. In so doing, each of the radio apparatuses can determine by the address in the first packet of the aggregated packets whether the aggregated packets are addressed to itself or not, so that it can avoid any unnecessary receive operation.

Since the destination address in the first packet is address 2, the control unit 30 of the second radio apparatus 10*b* can determine that it is the address for itself and acquire data 2-1, data 2-2 and data 2-3 by receiving and demodulating the rest of the data consecutively.

On the other hand, each of the control units 30 of the third radio apparatus 10*c* and the fourth radio apparatus 10*d* sees that the destination address in the first packet is not its own address and therefore does not receive the subsequent packets by terminating the receiving and demodulation at the point of recognition of the destination address in the first packet.

In an assignment mode, as described earlier, a plurality of partial durations are so arranged that a series of partial durations for transmitting a signal is followed by a series of partial periods or durations for receiving a signal. What is meant by "a series" here is not a series of two partial periods or durations without a break in between but a series even with a break where no partial period with another function is assigned. In other words, there is no problem if no partial period for receiving a signal is assigned in between partial periods for transmitting a signal. As mentioned already, when three terminal apparatuses, referred to as a second radio apparatus 10b to a fourth radio apparatus 10d, are to be connected, the base station apparatus may, for example, specify the transmission timings in the order of the second radio apparatus 10b to the fourth radio apparatus 10d. Similarly, the base station apparatus may specify the receiving timings in the order of the second radio apparatus 10b to the fourth radio apparatus 10d.

Terminal apparatuses transmit an ACK signal during the partial period for receiving a signal, and the baseband processing unit 22 or the like of the first radio apparatus 10a receives the ACK signal. The control unit 30, upon recognition of the receipt of the ACK signal, has the baseband processing unit 22 or the like prepare a next packet signal to be transmitted to the terminal apparatuses.

Figure 9:
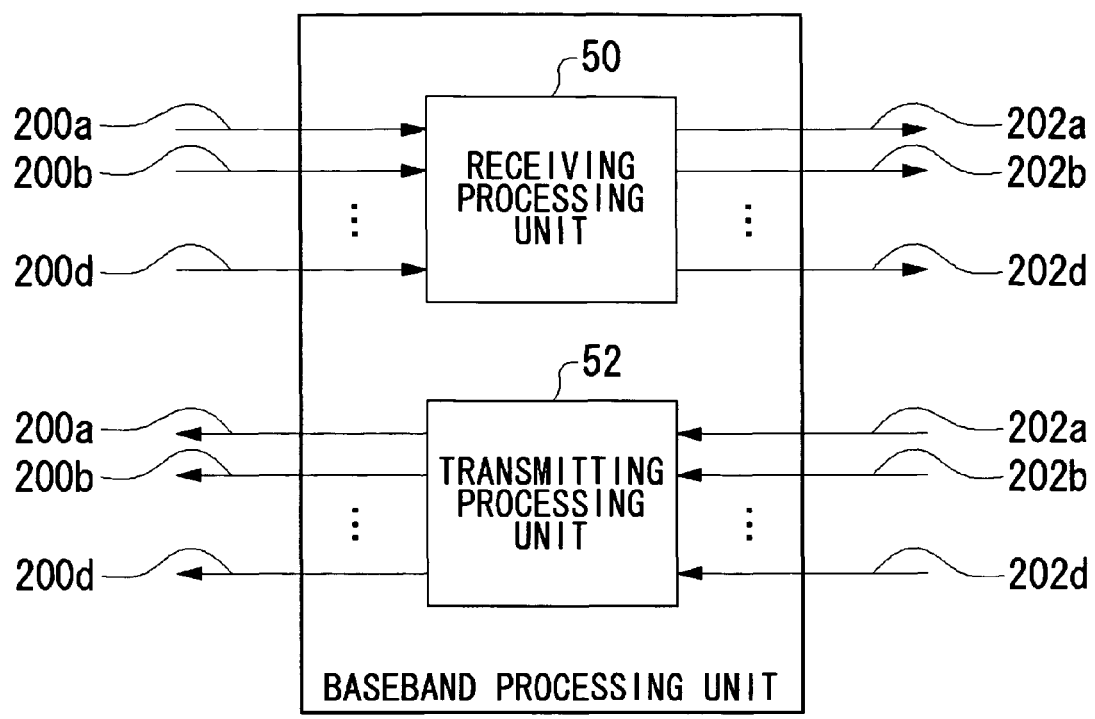
FIG. 9 illustrates a structure of a baseband processing unit shown in FIG. 4.

FIG. 9 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. The transmitting processing unit 52 applies CDD as shown in FIG. 3. The transmitting processing unit 52 outputs finally the time-domain signals 200.

Figure 10:
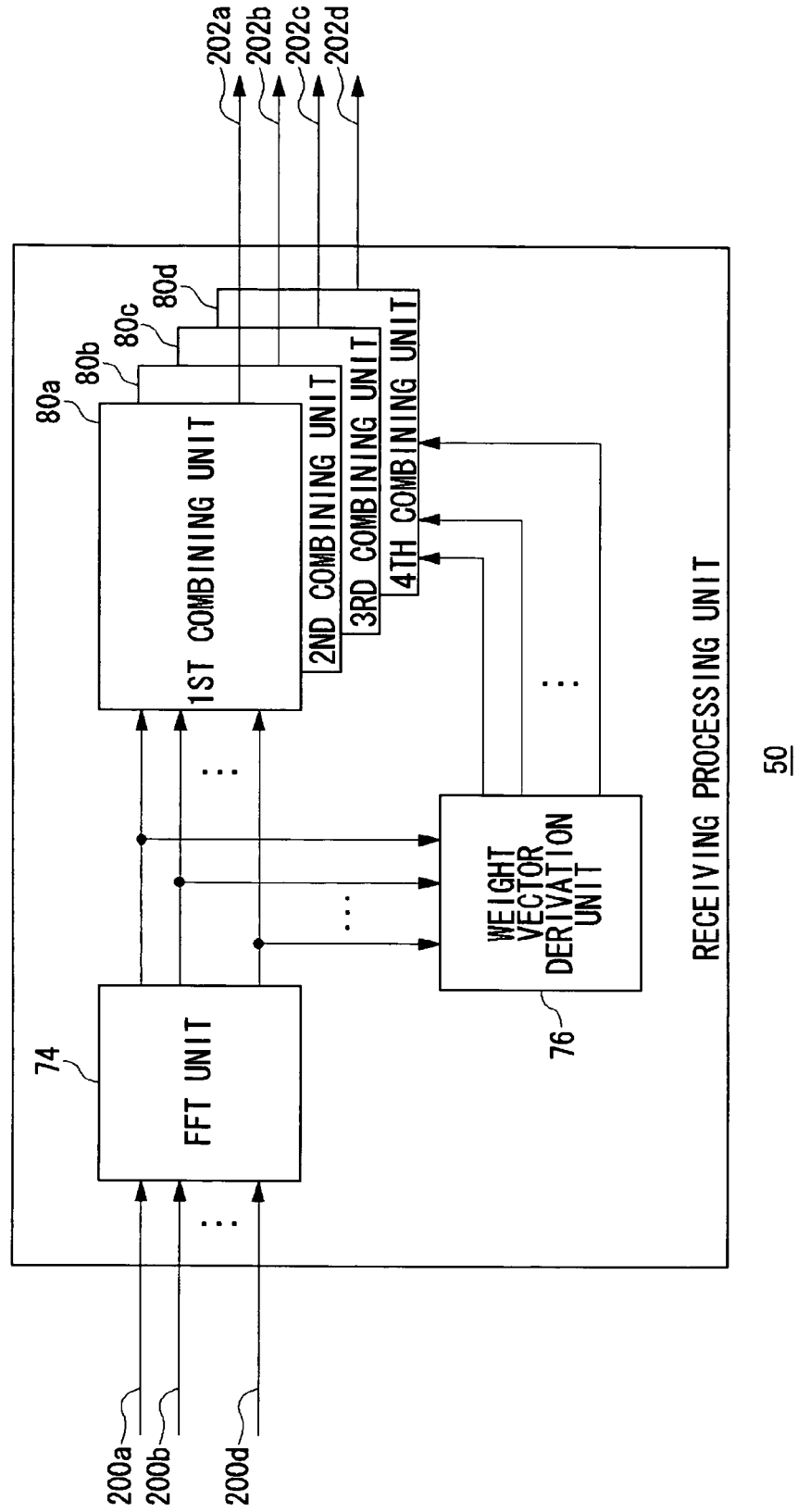
FIG. 10 illustrates a structure of a receiving processing unit shown in FIG. 9.

FIG. 10 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or a channel characteristics may be used. Since a known technique may be employed in the processing of these, the explanation thereof is omitted here. As described earlier, the weight vector derivation unit 76 derives a weight in the header portion of a packet signal and does not update the thus derived weight during the duration of this packet signal. As described earlier, the weights are finally derived per subcarrier, per antenna 12 and per stream.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplier is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 11:
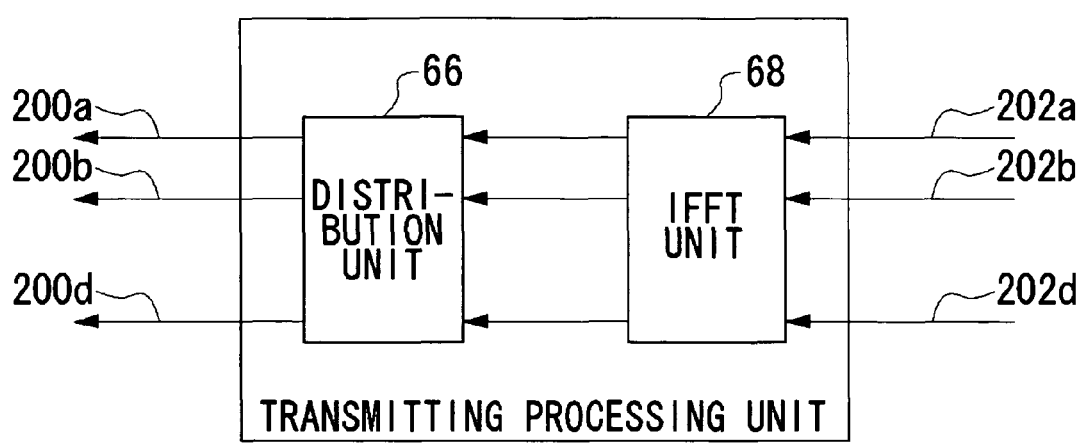
FIG. 11 illustrates a structure of a transmitting processing unit shown in FIG. 9.

FIG. 11 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. Since it is assumed here that the number of antennas 12 used is identical to the number of streams, each stream is directly associated with each antenna 12. The distribution unit 66 applies CDD to the streams to be transmitted, namely, "L-SIG" and the like among the respective packet signals.

An operation of the radio apparatus 10 structured as above will now be described so that the description on the operations of a base station and terminals are given separately.

Figure 12:
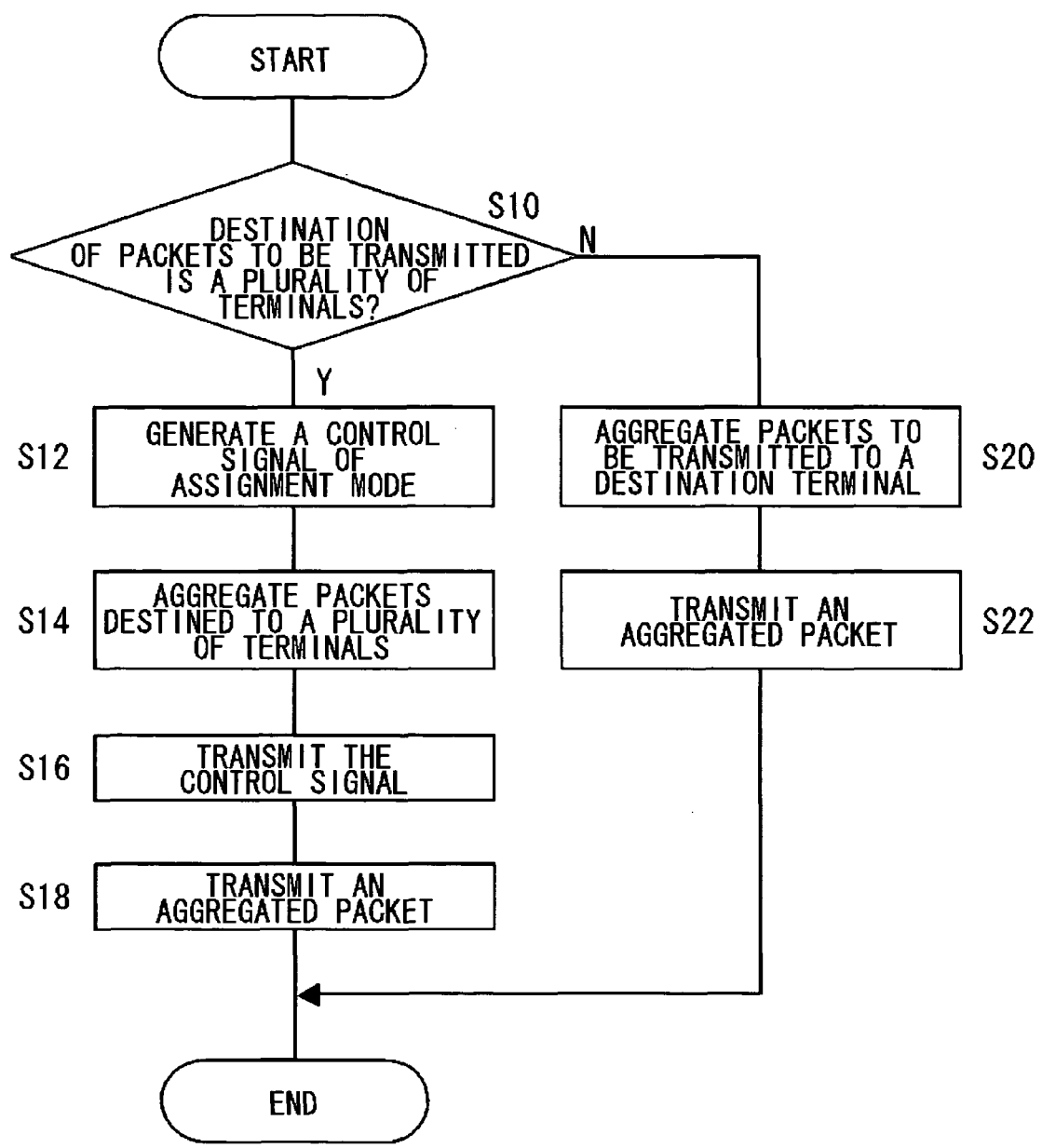
FIG. 12 is a flowchart showing an operation of a base station apparatus.

FIG. 12 is a flowchart for explaining the operation of a base station apparatus. The base station apparatus determines whether the destination (addressee) of the packets to be aggregated for transmission is a plurality of terminals or not (S10). If the aggregated packets are for a plurality of terminals (Y of S10), the base station apparatus generates a control signal of assignment mode (S12). Then the base station apparatus generates aggregated packets by aggregating packets destined to the plurality of terminals in MAC layer (S14).

The base station apparatus transmits the control signal (S16) and then, after a predetermined time interval, transmits the aggregated packets (S18).

Where packets destined to a single terminal are to be transmitted (N of S10), the base station apparatus generates an aggregated packet by aggregating packets to be transmitted to the terminal in MAC layer (S20) and transmits the aggregated packet (S22).

Figure 13:
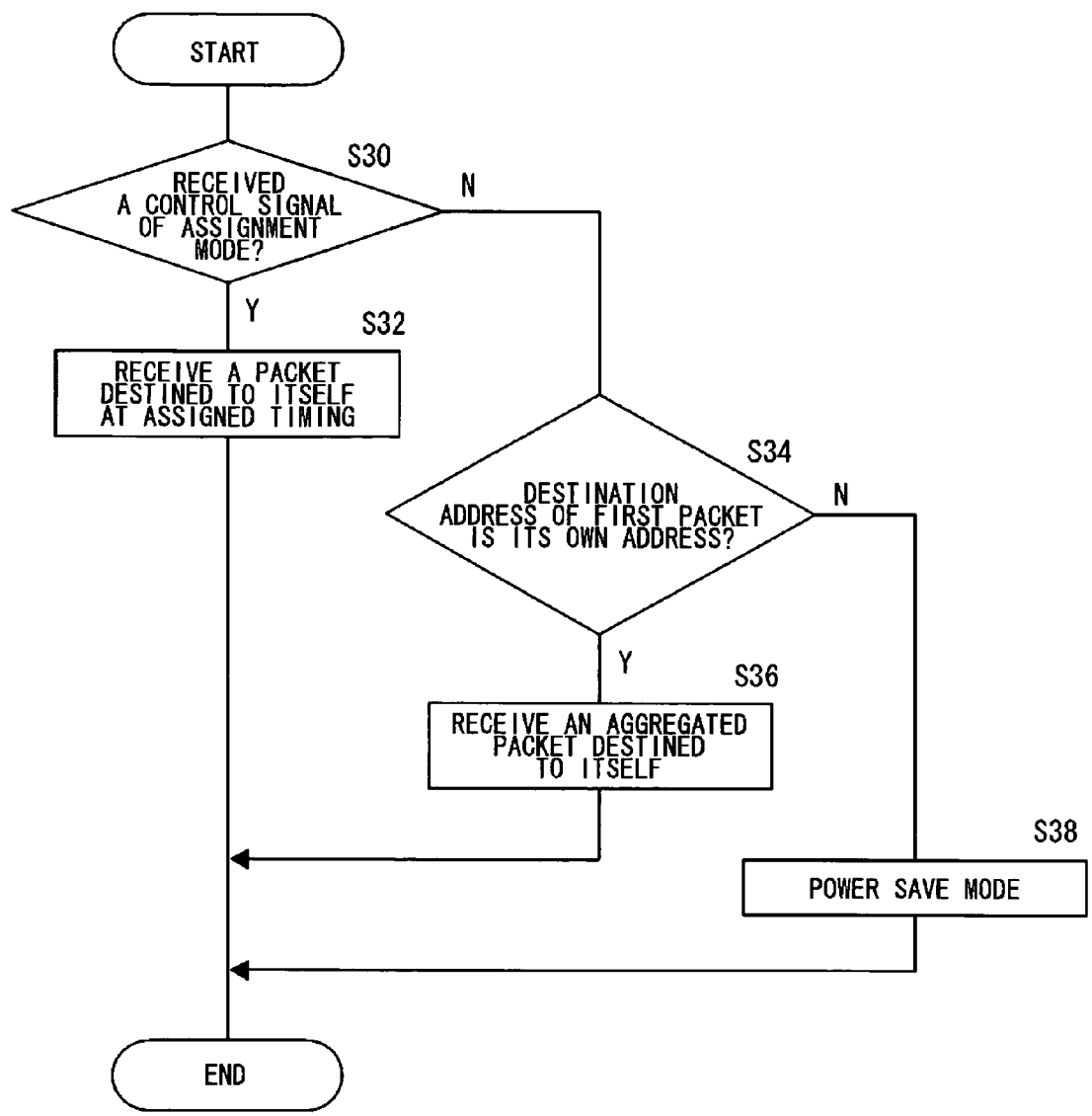
FIG. 13 is a flowchart showing an operation of a terminal apparatus.

FIG. 13 is a flowchart for explaining the operation of a terminal apparatus. When it has received a control signal of assignment mode (Y of S30), a terminal apparatus receives packets for itself at the assigned timing specified by the control signal (S32).

When it has not received a control signal of assignment mode (N of S30), a terminal apparatus receives and demodulates the first packet in the aggregated packets and checks to see in MAC layer if the destination address in the first packet is its own address (S34). If the first packet is the packet for itself (Y of S34), the terminal apparatus receives the aggregated packets for itself by receiving and demodulating the remaining packets in the aggregated packets (S36).

When it has not received a control signal of assignment mode (N of S30) and also when the destination address of the first packet in the aggregated packets is not its own address (N of S34), the terminal apparatus does not receive the remaining packets in the aggregated packets but enters a power save mode (S38).

According to the embodiments of the present invention, when a base station transmits aggregated packets for multiple receivers to the respective terminals, assigned timings therefore can be conveyed in advance to the respective terminals by a control signal. Hence, each of the terminals can selectively receive the packets addressed to itself from within the aggregated packets at the assigned timing or can enter a power save mode at timings other than the assigned timing. On the other hand, when a base station transmits aggregated packets for a single receiver to a terminal, it is not necessary to convey the receive timing to the terminal by use of a control signal, so that the transmission efficiency may be improved with reduced communication overhead resulting from the elimination of the generation and transmission of a control signal.

Moreover, in the single-receiver mode, where no control signal is transmitted from the base station, each of the terminals can see whether the aggregated packets are addressed to itself or not by checking the destination address in the first packet of the aggregated packets, so that power consumption can be reduced by not receiving the remaining packets in the aggregated packets.

The present invention has been described based on the embodiments which are only exemplary. It is therefore understood by those skilled in the art that other various modifications to the combination of each component and process are possible and that such modifications are also within the scope of the present invention.

In the multi-receiver mode in the present embodiments, the packet destined to each terminal may be one in which a plurality of packets are aggregated.

In the embodiments of the present invention, the communication system 100 uses multi-carriers. However, the present invention is not limited thereto and, for example, single carriers may be used instead. According to this modification, the present invention can be applied to various types of communication systems.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
   a determination unit adapted for a system in which, in the case that an aggregated packet in which packets destined to a plurality of terminal apparatuses are aggregated is transmitted, a control signal for communicating an assignment condition in the aggregated packet is transmitted to precede the aggregated packet by a predetermined time interval in the form of a packet different from the aggregated packet, the assignment condition being addresses of destination terminal apparatuses, and, in the case that an aggregated packet in which packets destined to a single terminal apparatus are aggregated is transmitted, a control signal is not transmitted so as to precede the aggregated packet, the determination unit determining, upon receipt of a control signal, whether a packet designated to the radio apparatus is included in a plurality of packets aggregated in the aggregated packet by referring to the addresses included in the control signal or the addresses included in the aggregated packet, and acquiring, upon failure to receive a control signal, information on a destination of a first packet among a plurality of packets aggregated to an aggregated packet and determining if the first packet is destined to the radio apparatus; and
   a communication unit which (i) receives a packet destined to the radio apparatus and enters a power save mode at the timing not assigned to the radio apparatus if the packet is included in the aggregated packet, and which, (ii) if a control signal is not received and it is determined by said determination unit that the information on a destination of the first packet does not indicate the radio apparatus, terminates receiving the aggregated packet instantly without receiving the remaining packets in the aggregated packet if it is determined by said determination unit that the first packet is not destined to the radio apparatus.

2. A radio apparatus according to claim 1, wherein when the control signal with which to convey the assignment condition in the aggregated packet has not been received and the aggregated packet to which packets destined to one or more terminal apparatuses are aggregated has been transmitted, said communication unit receives the remaining packets in the aggregated packet if it is determined by said determination unit that the first packet is destined to oneself.

3. A communication system, comprising:
   a base station apparatus which generates an aggregated packet by aggregating packets destined to one or more terminal apparatuses and transmits the generated aggregated packet;
   a plurality of terminal apparatuses which receive aggregated data transmitted from said base station apparatus,
   wherein when packets destined to the plurality of terminal apparatuses are aggregated to the aggregated packet, said base station apparatus divides a certain period into a plurality of partial periods, assigns the plurality of partial periods respectively to any of the plurality of terminal apparatuses, generates a control signal with which to notify an assignment condition of the terminal apparatuses and which is formed as a packet different from the aggregated packet, the assignment condition being addresses of destination terminal apparatuses, and transmits, when a predetermined time period has elapsed after the control signal is received, the aggregated packet, including addresses of destination terminal apparatuses, to the plurality of terminal apparatuses, based on the control signal, and wherein when packets destined to a single terminal apparatus are aggregated, said base station apparatus transmits the aggregated packet, including addresses of destination terminal apparatus, to the plurality of terminal apparatuses without transmitting the control signal,
   wherein the terminal apparatus (i) receives a packet destined to the terminal apparatus and enters a power save mode at the timing not assigned to the terminal apparatus if the control signal is received from the base station apparatus and if the packet is included in the aggregated packet, and (ii) if the control signal is not received from the base station apparatus and if it is determined that the information on a destination of the first packet among a plurality of packets aggregated to the aggregated packet does not indicate that the first packet is destined to the terminal apparatus, terminates receiving the aggregated packet instantly without receiving the remaining packets in the aggregated packet.

4. A communication system according to claim 3, wherein when the terminal apparatus has not received the control signal from said base station apparatus and it is determined, by information on the destination of the first packet, that the first packet is destined to oneself, the terminal apparatus receives the remaining packets in the aggregated packet.

* * * * *